United States Patent
Adkins et al.

(10) Patent No.: US 7,131,898 B2
(45) Date of Patent: Nov. 7, 2006

(54) ADJUSTABLE SURFACE POSITIONING GUIDE FOR A ROTARY HAND-HELD TOOL

(75) Inventors: Edward Adkins, Rockford, IL (US); John Kochanski, Palatine, IL (US)

(73) Assignee: Nomis LLC, Hampshire, IL (US)

( * ) Notice: Subject to any disclaimer, the term of this patent is extended or adjusted under 35 U.S.C. 154(b) by 196 days.

(21) Appl. No.: 10/825,708

(22) Filed: Apr. 16, 2004

(65) Prior Publication Data

US 2004/0208719 A1    Oct. 21, 2004

Related U.S. Application Data

(60) Provisional application No. 60/463,615, filed on Apr. 17, 2003.

(51) Int. Cl.
*B24B 41/00* (2006.01)
*B27C 5/10* (2006.01)
*B23C 1/20* (2006.01)

(52) U.S. Cl. ............ 451/360; 451/439; 409/178; 409/183; 144/136.95; 144/137

(58) Field of Classification Search .......... 451/360, 451/439; 409/178, 180, 182, 183; 144/136.95, 144/137
See application file for complete search history.

(56) References Cited

U.S. PATENT DOCUMENTS

| | | | | |
|---|---|---|---|---|
| 4,273,483 A | * | 6/1981 | Mendicino | ............ 409/178 |
| 4,655,653 A | * | 4/1987 | Hall et al. | ............ 409/182 |
| 6,244,796 B1 | | 6/2001 | Schuebel et al. | |
| 6,679,658 B1 | * | 1/2004 | Landt | ............ 409/182 |
| 2005/0244240 A1 | * | 11/2005 | Sheffield | ............ 409/182 |

OTHER PUBLICATIONS

Dremel, *Dremel Catalog, Tools for the Imagination*, Jul. 1999, 72 pages total copied onto 36 sheets.
Rotozip Tool Corporation, *Rebel Spiral Saw Power Tool Quick Reference Guide.*, Aug. 2000, 6 pages.
Roto Zip UK Ltd., *Spiral Saw Power Tool Catalog*, 2000, 4 pages.

* cited by examiner

*Primary Examiner*—Eileen P. Morgan
(74) *Attorney, Agent, or Firm*—Reinhart Boerner Van Deuren P.C.

(57) ABSTRACT

A removable surface positioning guide for a rotary hand-held tool provides one or more adjustable features for selective positioning of a surface engaging bit driven by the rotary hand-held tool. The surface positioning guide may include a pivot joint between a guide base and a mounting adapter. The guide base pivots relative to the mounting adapter about the pivot joint between operable positions. The surface positioning guide may include at least one spring supported by the mounting adapter either directly or indirectly that biases a guide base axially away from the mounting adapter. The guide base is movable toward the mounting adapter against the biasing of the at least one spring to effect a plunging movement. The surface positioning guide may include a reversible or interchangeable base flange with differently configured faces that are adapted to be placed against a working surface.

33 Claims, 8 Drawing Sheets

ADJUSTABLE SURFACE POSITIONING GUIDE FOR A ROTARY HAND-HELD TOOL

CROSS-REFERENCE TO RELATED PATENT APPLICATIONS

This patent application claims the benefit of U.S. Provisional Patent Application No. 60/463,615, filed Apr. 17, 2003.

FIELD OF THE INVENTION

This invention pertains to surface positioning guides for rotary hand-held tools and more specifically to removable surface positioning guides that can be removably mounted to rotary hand-held tools.

BACKGROUND OF THE INVENTION

Rotary hand-held tools are common tools that are frequently used for a variety of work tasks around the house and workplace. There are literally hundreds of different attachable and detachable surface engaging bits for these rotary hand-held tools, including, for example bits configured for such tasks as carving, engraving, routing, grinding, sanding, sawing, sharpening, cutting, polishing, cleaning, drilling and other work tasks. The versatility of such rotary hand-held tools and interchangeability of bits has made these tools very popular in the marketplace. The small size of these tools are also advantageous and provide for easy manipulation. One of the more popular rotary hand held tools include the Dremel® brand rotary tools.

These rotary hand-held tools include a housing having a size and contour that provides a gripping surface and a rotary output that is driven by a motor contained within the housing (e.g. an output shaft, chuck and/or collet). Different types of bits can be readily attached and detached to the rotary output to be driven thereby about an axis of rotation. In addition, the housings of these devices conventionally provide a screw thread for attachment of a surface positioning guide. Such positioning guides are sometimes referred to as "cutting guides". The guides may be used in such applications as dry wall cutting to cut holes for electrical switches, outlets and the like. A surface positioning guide is disclosed in U.S. Pat. No. 6,244,796 to Schuebel et al. The '796 patent generally discloses a surface positioning guide that is angled and includes groove tabs to facilitate use of the rotary tool for such applications as grout removal.

While rotary hand-held tools are very versatile, it will be readily appreciated that the large number of bits and different guides and other housing attachments can quickly run up the costs and expense for someone who wishes to have all of the available options and features for their tool. Further, the more different bits and attachments a person has, the more difficult it is to organize the attachments in an orderly and compact manner. Further, there is always a desire to increase the functions and versatility of such rotary tools. Heretofore, there have been significant drawbacks in some existing products, which will readily be appreciated once the present invention is appreciated.

BRIEF SUMMARY OF THE INVENTION

The present invention provides a more adjustable surface positioning guide that increases the versatility of rotary hand-held tools and that decreases the number of different surface positioning guides and/or other attachments needed for rotary hand-held tools. Several different inventive aspects are disclosed and claimed herein.

According to one aspect, the surface positioning guide includes a pivot joint between a guide base and a mounting adapter adapted to be removably coupled to the screw thread of rotary hand-held tools. The guide base pivots relative to the mounting adapter about the pivot joint between operable positions. The respective openings of the mounting adapter and the guide base align with each other in the operable positions so as to communicate the driven bit of the rotary hand-held tool through the guide base.

According to another aspect of the present invention, a surface positioning guide includes at least one spring supported by the mounting adapter either directly or indirectly that biases a guide base axially away from the mounting adapter. The guide base is movable toward the mounting adapter against the biasing of the at least one spring to effect a plunging movement such that the bits of rotary hand-held tools can be selectively plunged into a working surface. The surface positioning guide includes a first stop arranged to limit how far the guide base is biased away from the mounting adapter and a second stop arranged to limit how far the guide base can be moved toward the mounting adapter.

According to another aspect of the present invention, the guide base of a surface positioning guide includes a reversible and/or interchangeable base flange. The base flange defines an opening which is adapted to receive the surface engaging bit therethrough. The base flange also defines first and second faces. The base flange is movable relative to a support member which is carried by the mounting adapter to selectively locate either the first face or the second face at a foremost end of the removable surface positioning guide for engaging the working surface.

According to another aspect of the present invention, a removable surface positioning guide for a rotary hand-held tool comprises a mounting adapter integrally including an internally threaded sleeve portion concentric about a tool axis that is adapted to be threadably mounted to the housing of the rotary hand-held tool. The mounting adapter also includes a pair of axially extending linear guides and a first stop. The removable surface positioning guide also comprises a pivot body integrally including a pair of linear tracks sliding against the linear guides such that the pivot body is axially movable relative to the mounting adapter. The pivot body defines a pivot axis perpendicular to the tool axis and a pair of pivot support structures on the pivot axis. At least one spring that is supported by the mounting adapter biases the pivot body away from the mounting adapter. The first stop engages the pivot body to limit how far the pivot body is biased away from the mounting adapter. A pair of pillow blocks integrally provide hinge structures pivotably supported by the pivot support structures. The pillow blocks support a base flange is a position for engaging the working surface. The base flange is supported by the pillow blocks and defines an enclosed opening adapted to receive the surface engaging bit therethrough.

Other aspects, objectives and advantages of the invention will become more apparent from the following detailed description when taken in conjunction with the accompanying drawings.

DETAILED DESCRIPTION OF THE INVENTION

Figure 1:
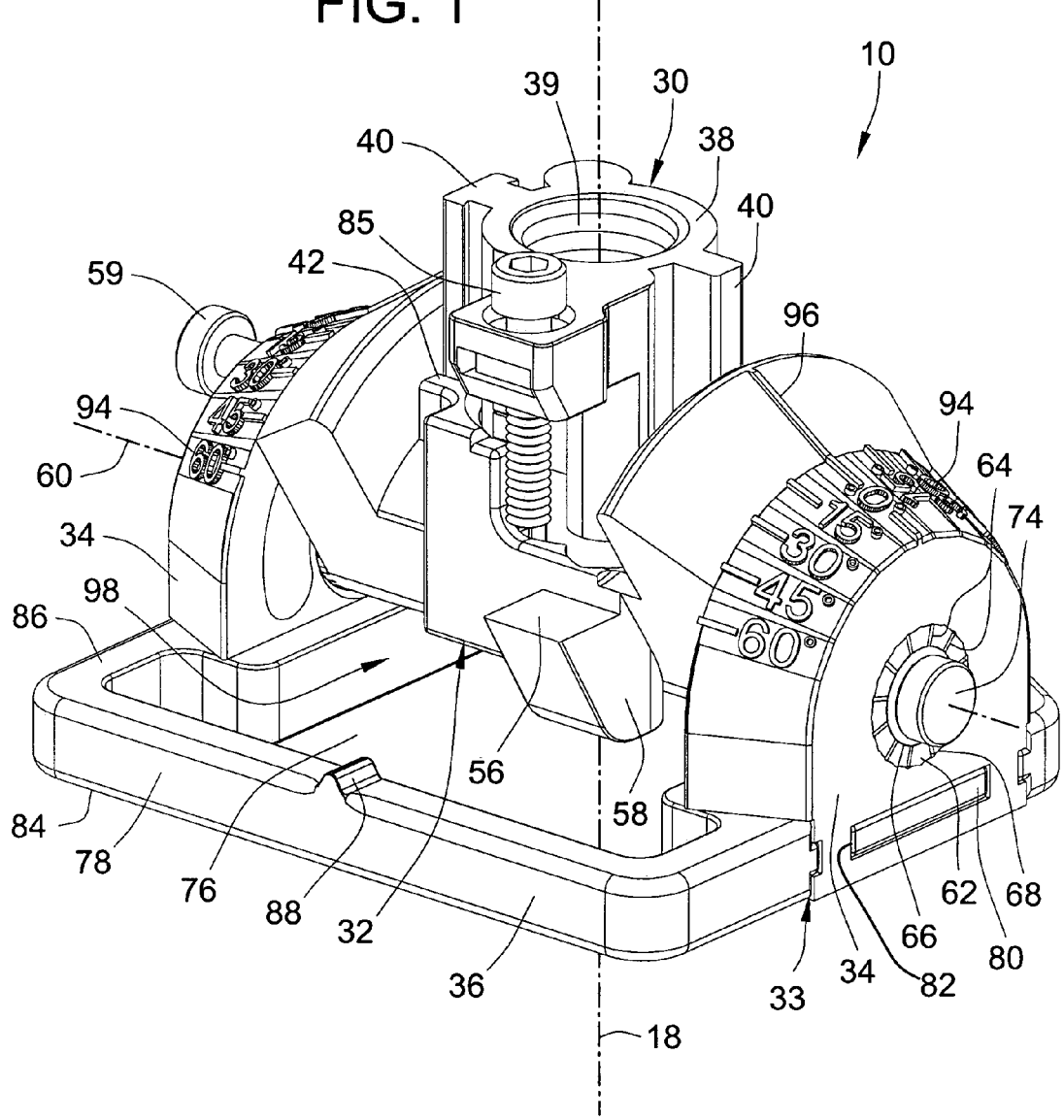
FIG. 1 is an isometric view of a removable surface positioning guide for a rotary hand-held tool in accordance with an embodiment of the present invention.
Figure 2:
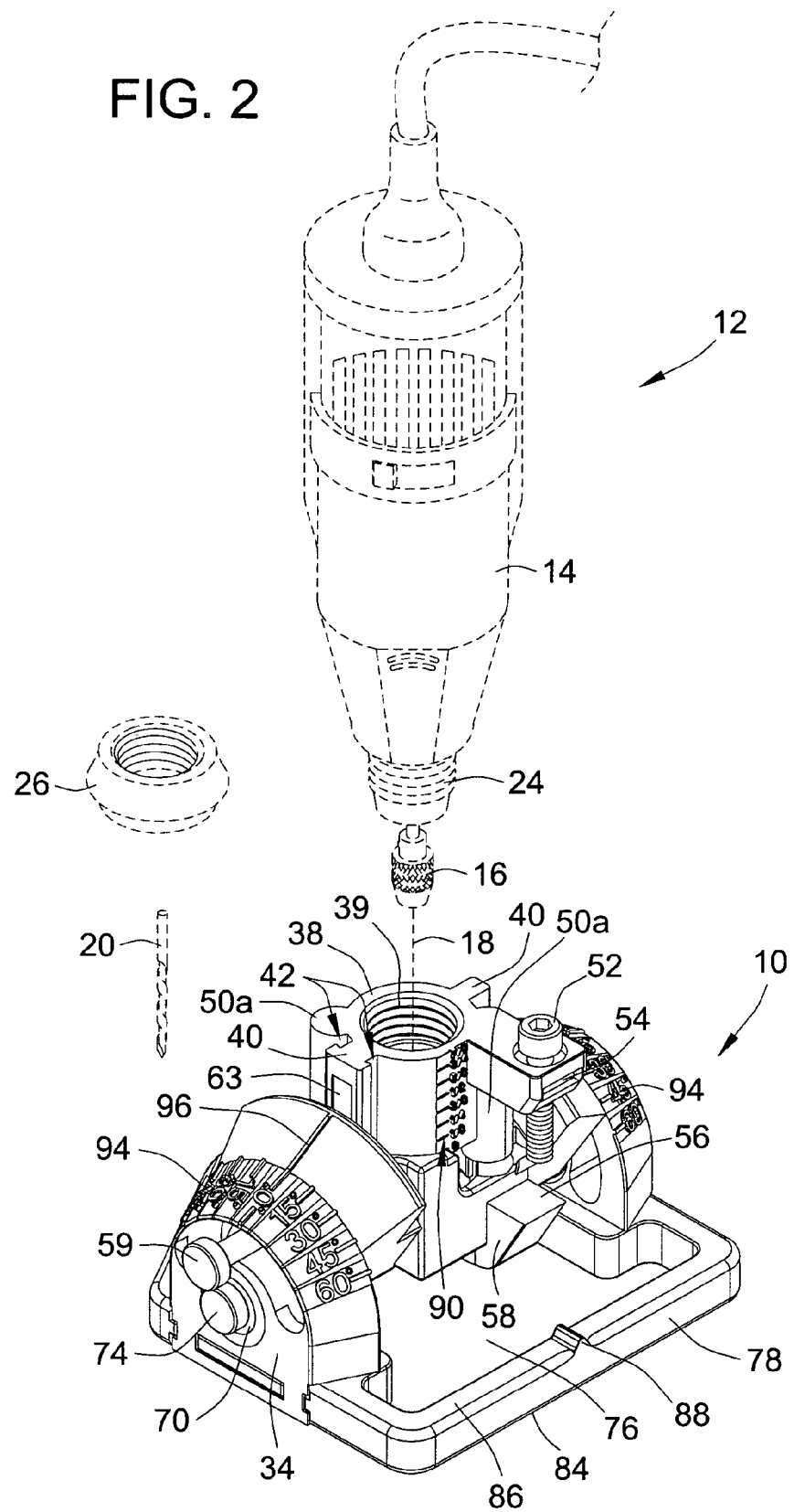
FIG. 2 is an isometric view of the removable surface positioning guide in combination with a rotary hand-held tool shown in dashed lines to illustrate how the surface positioning guide mounts to the front end of a rotary hand-held tool.

Referring to FIGS. 1–2, an embodiment of the present invention is illustrated as a removable surface positioning guide 10 for a rotary hand-held tool 12 (which is illustrated as a commercially available Dremel® rotary tool).

Before turning to the details of the removable surface positioning guide 10, a brief description of the rotary hand-held tool 12 will be given to provide a better understanding of the disclosed embodiments. Referring to FIG. 2, the rotary hand-held tool 12 includes a generally ring shaped housing 14 which can be manually grasped for manipulation. The housing 14 contains a motor (not shown) and a rotary output at its front end shown as a chuck or collet 16 that is extended by a surface engaging bit 20 when attached. The collet 16 is driven about a tool axis 18 by the motor and provides for ready attachment and detachment from the surface engaging bit 20 which is used to engage a working surface. Also at the front end, the housing 14 defines a threaded attachment tip 24 which can be used to removably attach various surface positioning guides, such as the guide 10 disclosed herein. A protective cover or cap 26 that screws on the is threaded attachment tip 24 is typically provided to protect the threaded attachment tip 24 of the rotary hand-held tool 12 when a surface positioning guide attachment is not being used.

Figure 3:
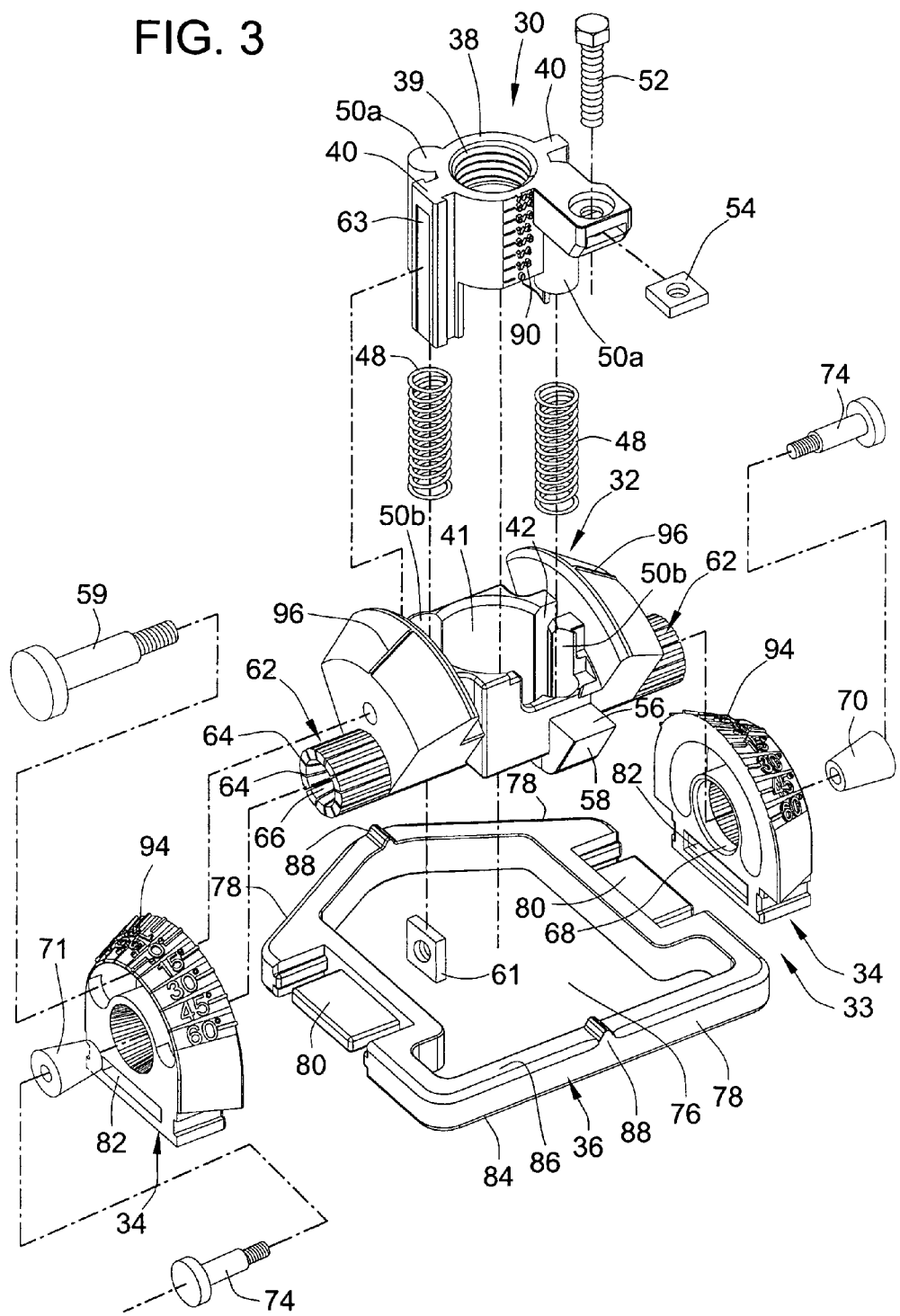
FIG. 3 is an exploded isometric assembly drawing of the surface positioning guide shown in previous Figures.

Referring now to FIGS. 1–3, the illustrated embodiment of the surface positioning guide 10 includes a mounting adapter 30, a pivot body 32, and a guide base 33, which may comprise a pair of pillow blocks 34 and a base flange 36. In a preferred embodiment, all of these primary structural components may be molded or formed from plastic material. With this arrangement axial sliding occurs with plastic to plastic sliding contact and pivoting occurs with plastic to plastic pivoting contact. The mounting adapter 30 integrally includes an internally threaded sleeve portion 38 that is concentric about the tool's rotational axis 18. As indicated in FIG. 2, the threaded sleeve portion 38 screws onto to thread threaded attachment tip 24 of the housing 14 of the rotary hand-held tool 10. The mounting adapter 30 carries and supports, either directly or indirectly, the other components of the surface positioning guide 10 when mounted to the rotary hand-held tool 10. The mounting adapter 30 also defines a central opening 39 extending therethough is sized and arranged to communicate the rotary output communicated by the collet 16 and the surface engaging bit 20 through the middle region of the surface positioning guide 10 when mounted to the rotary hand-held tool 12.

Figure 8:
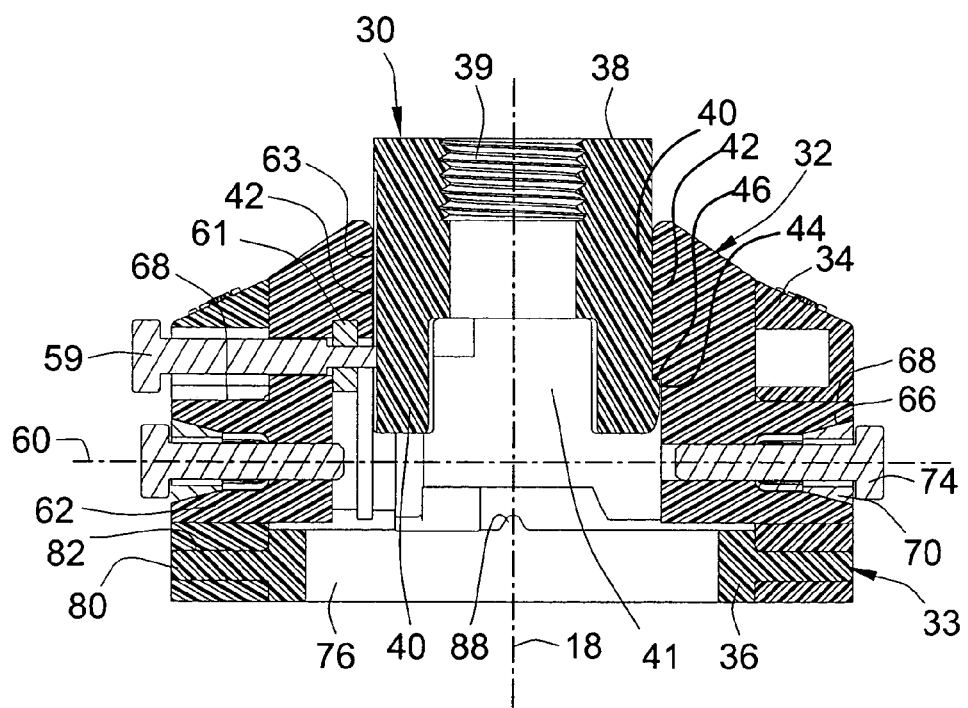
FIG. 8 is a cross section of the surface positioning guide taken about line 8—8 of FIG. 5.

The pivot body 32 is slidably carried by the mounting adapter 30. The pivot body 32 defines a central opening 41 therethrough about the tool axis 18 that slidably receives the mounting adapter 30 and that also provides central clearance for communicating the surface engaging bit 20 through the surface positioning guide 10. To facilitate and guide linear sliding motion, and referring to FIGS. 1, 3, and 8, the mounting adapter 30 integrally includes and unitarily defines a pair of linear guide rails 40 that are received in linear guide tracks 42 of the pivot body 32. The ends of at least one of the rails 40 integrally defines a stop tab 44 that engages a corresponding abutment surface 46 on the pivot body 32 to limit how far the pivot body 32 can axially slide away from the mounting adapter 30. The stop tab 44 may also be used to axially retain the pivot body 32 on the mounting adapter 30 as indicated in the preferred embodiment.

Figure 7:
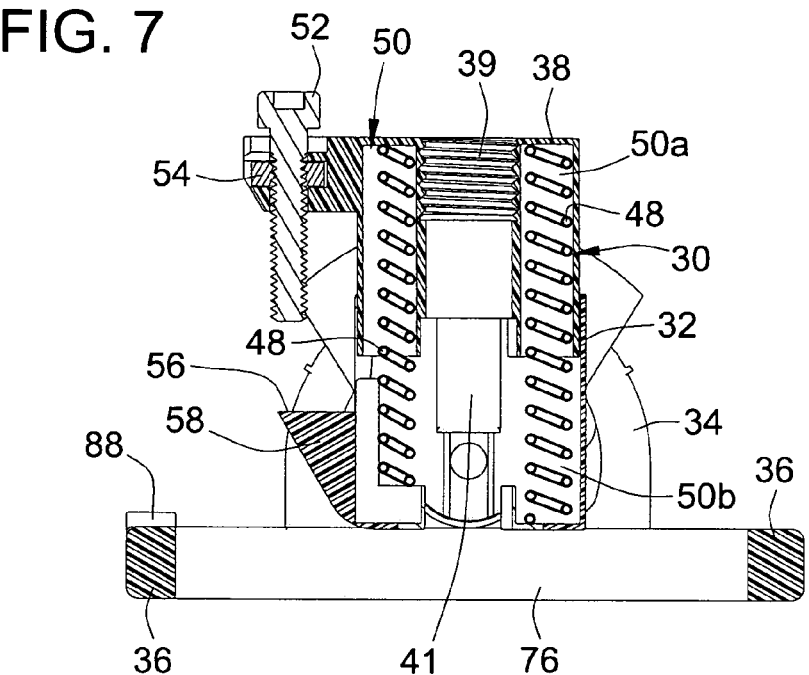
FIG. 7 is a cross section of the surface positioning guide taken about line 7—7 of FIG. 4.

Referring to FIGS. 3 and 7, one or more springs 48 are arranged between the pivot body 32 and the mounting adapter 30. The springs 48 may be contained within a spring chamber 50, with different portions of the spring chamber 50a, 50b being integrally formed into the pivot body 32 and the mounting adapter 30. As shown, when multiple springs are used, the springs are preferably equally spaced angularly about the tool axis 18 to ensure balance of forces along the linear guide mechanism. The springs 48 are supported by the mounting adapter 30 and serve to bias the pivot body 32 and the guide base 33 away from the mounting adapter 30.

The mounting adapter 30 also includes another stop which may be adjustable for limiting the linear sliding movement of the pivot body 32 and guide base 33 toward the mounting adapter 30. In the disclosed embodiment, the adjustable stop is provided by a threaded bolt 52 that is screwed into a threaded hole 54 formed into the mounting adapter 30. The threaded bolt 54 may be rotated to adjust its axial position with an axially aligned abutment surface 56 defined by an outward extending tab 58 on the pivot body 32. When the end of the bolt 54 strikes the abutment surface 56, the linear sliding movement of the pivot body 32 and guide base 33 is stopped.

An advantage of this arrangement is that the guide base 33 is movable toward the mounting adapter 30 against the biasing of the springs 48 to effect a plunging movement such that the bit 20 driven by the rotary hand-held tool 12 can be plunged into a working surface. The adjustable stop provided by the threaded bolt 52 can be used to control the depth of the plunging movement and therefore the depth of the bit 20 into the working surface. Since the guide base 33 can be positioned against the working surface, the guide base 33 can be utilized to hold and position the rotary tool 12 at a fixed angular orientation, such the plunging movement can be effected directly along the axis 18. This can prevent lateral movement or shifts in orientation, thereby increasing accuracy and precision when drilling holes with drilling bits or driving into a working surface with other surface engaging bits.

In addition, a lock is preferably provided to hold relative axial positions when plunging movement is not desired. The lock is provided by a thumb screw 59 (shown as a shoulder bolt) that can be used to selectively clamp the pivot body 32 to the mounting adapter 30. Although a thumb screw 59 is illustrated, it will be appreciated that the lock may be alternatively provided by other forms of clamping mechanisms or lock mechanisms (e.g. a pin and hole device). The thumb screw 59 is screwed into a nut 61 that is supported by the pivot body 32. The end of the thumb screw 59 fits into a axial slot 63 formed into the mounting adapter 30. The screw 59 can be selectively tightened to axially fix the relative positions of the pivot body 32 (and thereby the guide base) at one of a number of relative axial positions or selectively loosened to allow for plunging movement.

The pivot body 32 defines a pivot axis 60 perpendicular to the tool axis 18 and a pair of cylindrical pivot support structures 62 that project laterally outward along the pivot axis 60. The pivot support structures 62 may include lateral slits 64 such that the pivot support structures 62 have some flexibility and are able to flex radially outward slightly when wedges 70, 71 are inserted into conical openings 66 formed centrally in the pivot support structures 62. The slits 64 may also provide for a detent mechanism that provides for clicking between discrete angular positions when the guide base 33 is pivoted about the pivot axis 60.

Referring to FIG. 3, the pillow blocks 34 of the support base 33 comprise pivot/hinge structures shown cylindrical openings 68 that slidably received the pivot support structures 62 of the pivot body 32. The pillow blocks 34 are fitted on the pivot support structures 62 on opposed lateral ends of the pivot body 32 for pivoting movement relative thereto about the pivot axis 60. The wedges 70, 71 when pressed into the conical openings 66 of the support structure are operable to flex the pivot structures 62 outwardly in a manner that laterally retains the pillow blocks 34 on the pivot body 32, while also allowing for pivoting movement of the guide base 33 relative to the pivot body 32. One or more screws 74 may be used to better secure the wedges 70, 71 in place if desired.

In addition, one or both of the screws 74 can serve as a locking device for selectively fixing the angular position of the pivot body 32 relative to the guide base 33. Although a thumb screw 74 is illustrated, it will be appreciated that the locking device may be alternatively provided by other forms of clamping mechanisms or lock mechanisms (e.g. a pin and hole device).

The pillow blocks 34 carry and support the base flange 36. The base flange 36 defines a central opening 76 that is large enough such that the central opening 76 axially aligns with central opening 39 of the mounting adapter 30 in different operable axial and angular positions between the guide base 33 and the mounting adapter 30. In this manner, a suitable surface engaging bit 20 can be communicated through the openings 39, 76 for engaging a working surface. The base flange 36 may comprise flat outer rail surfaces 48 that can be used to laterally position or offset the surface engaging bit 20 laterally from an edge or wall perpendicular to the working surface. However, it will be appreciated that the base flange 36 can alternative take multiple shapes or forms such as circular if desired. The base flange 36 may fully enclose the opening 76 or partially enclose the central opening 76.

The base flange 36 includes tabs 80 that project laterally outward. The tabs 80 slide and/or snaps into a corresponding receiving slots 82 formed into the pillow blocks 34. In this manner, the base flange 36 is readily removable and can be interchanged with outer flange members of different configuration if desired. Additionally, the base flange 36 can be reversed to locate either a first face 84 or a second face 86 at the foremost end of the guide 10 and tool 12, where the face is positioned for engaging and if desired sliding against a surface. This provides the advantage of further increasing versatility of the positioning guide 10. As shown the first face 84 (currently located at the foremost end) is planar such that it can slide easily against a planar surface (e.g. drywall). The second face 86 is generally planar but also includes projecting guide tabs 88 that can be received into grooves in a working surface (e.g. such as grout grooves) which can be useful if it is desired that the surface positioning guide 10 follow a groove in the working surface during use. The guide tabs 88 are linearly aligned perpendicular relative to the pivot axis 60 such that the surface engaging bit 20 aligns linearly with the guide tabs 88 when in use. The base flange 36 can readily be reversed by unscrewing the thumb screw 74 and removing one of the pillow blocks 34 to release the base flange 36. The base flange 36 can be flipped and reconnected to the pillow blocks 34 to selectively locate either of the first and second faces 84, 86 at the foremost end for engaging a working surface.

Figure 4:
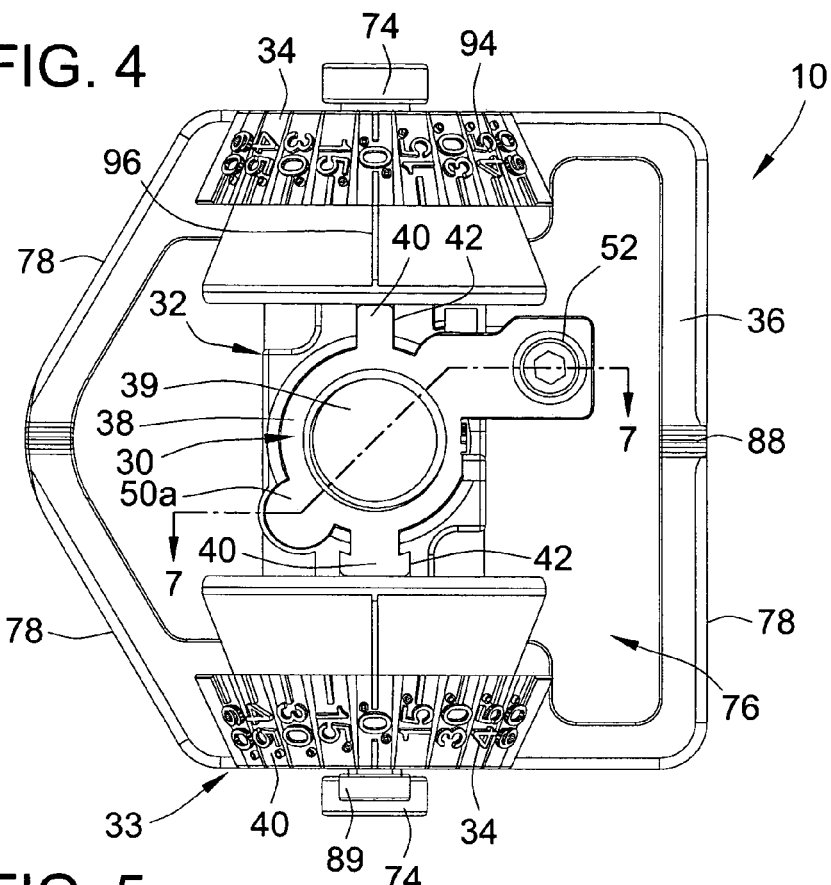
FIGS. 4–6 are plan, side elevation and bottom side views of the surface positioning guide shown in previous Figures.
Figure 5:
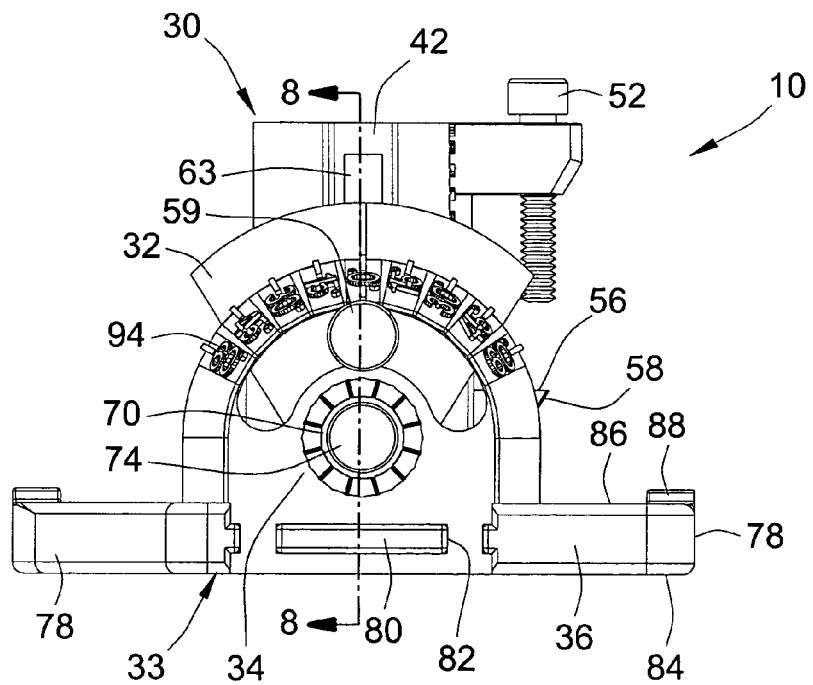
Figure 6:
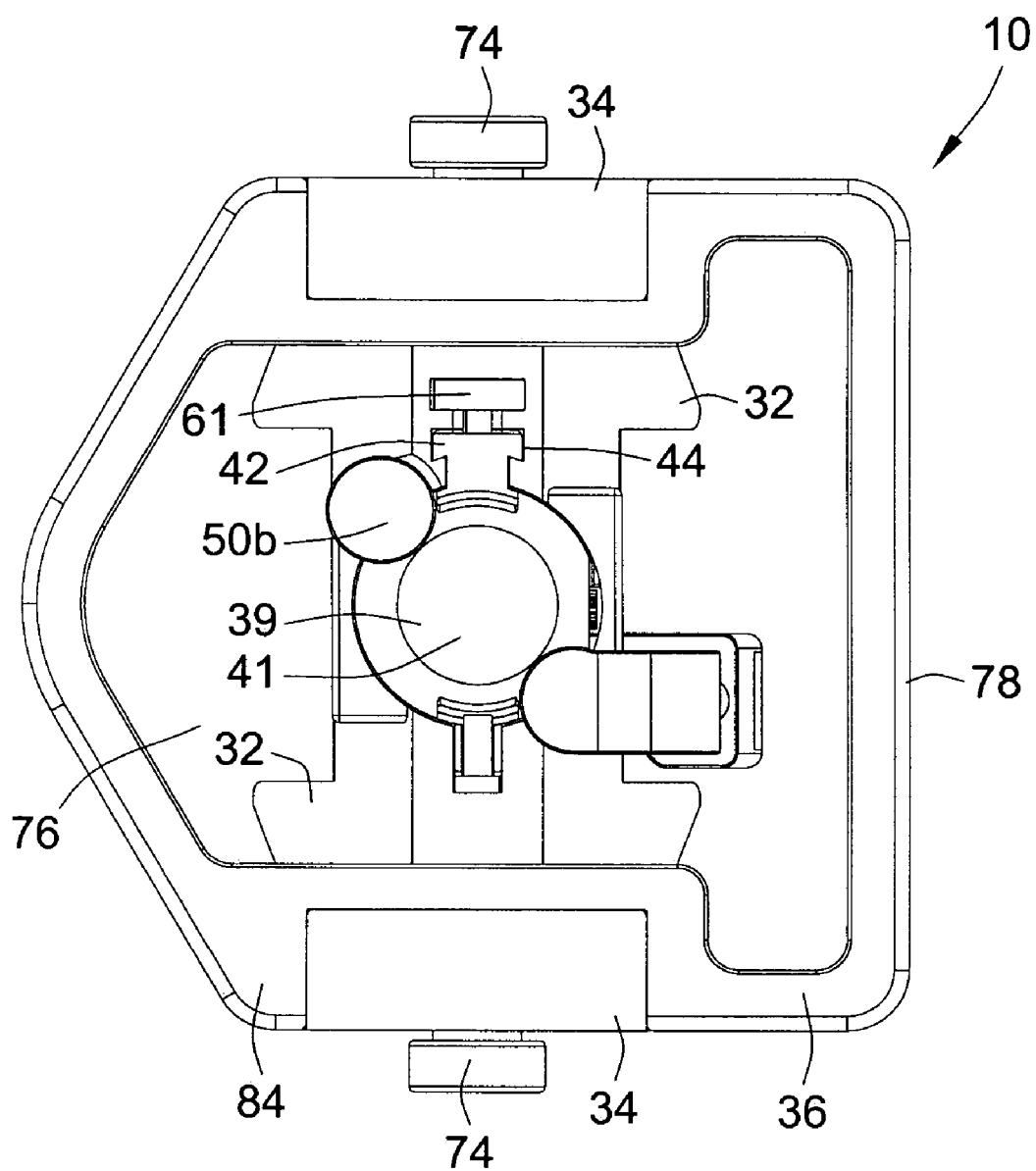

In either position, the base flange 36 is generally open above to provide viewing windows 98. The viewing windows 98 may be defined by multiple components when assembled as shown in FIGS. 1, 4 and 5, where it is shown to be generally between the base flange 36, pillow blocks 34 and pivot body 32. Users can look through the viewing windows 98 to view the surface engaging bit 20 as it acts upon the working surface.

The surface positioning guide 10 may also optionally include indicating mechanisms that indicate the angle and axial depth of the surface engaging bit 20 relative to the working surface when in use. Accordingly, an axial scale 90 and point 92 may be provided between the pivot body 32 and the mounting adapter 30 for indicating axial position and depth. An angular scale 94 and pointer 96 may be provided between the pivot body 32 and one or both of the pillow blocks 34 for indicating angular position.

Figure 9:
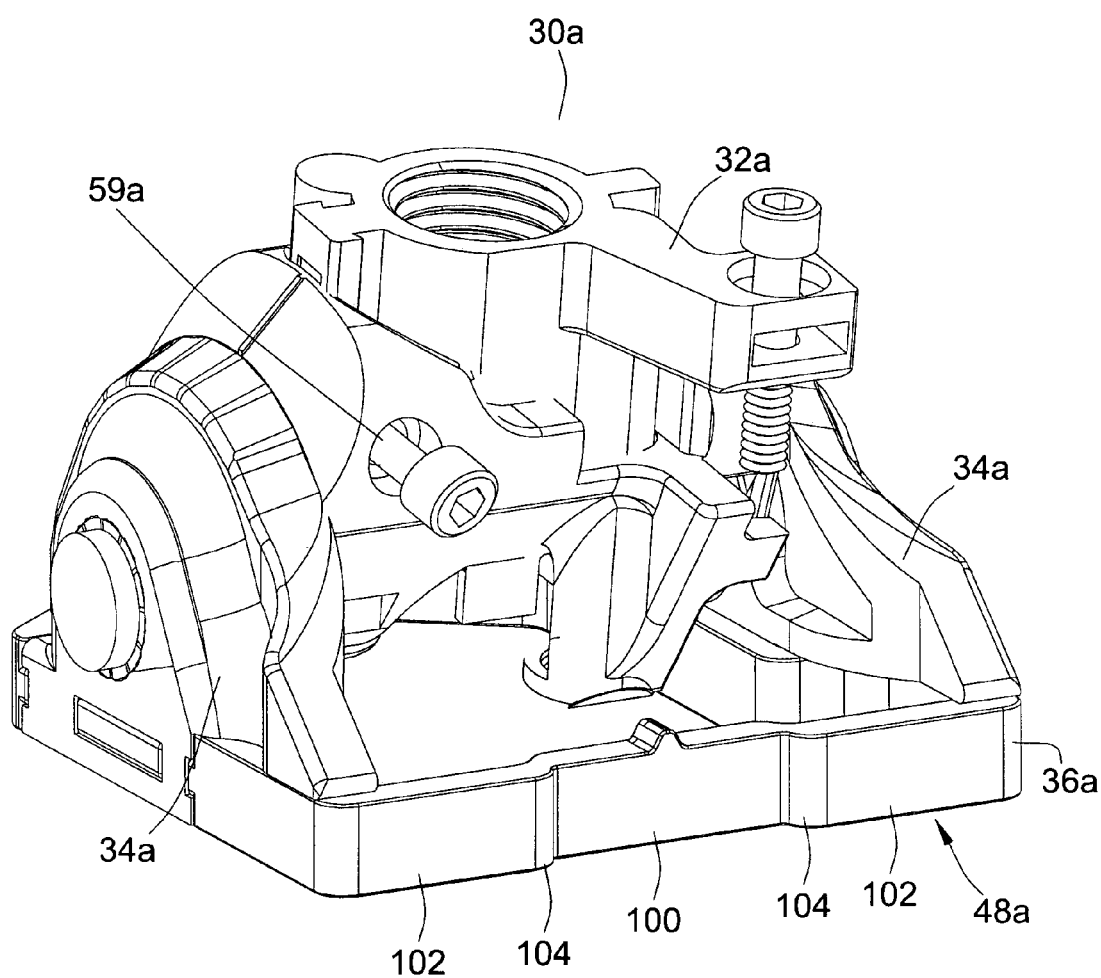
FIGS. 9–10 are isometric illustrations of an alternative embodiment of the present invention.
Figure 10:
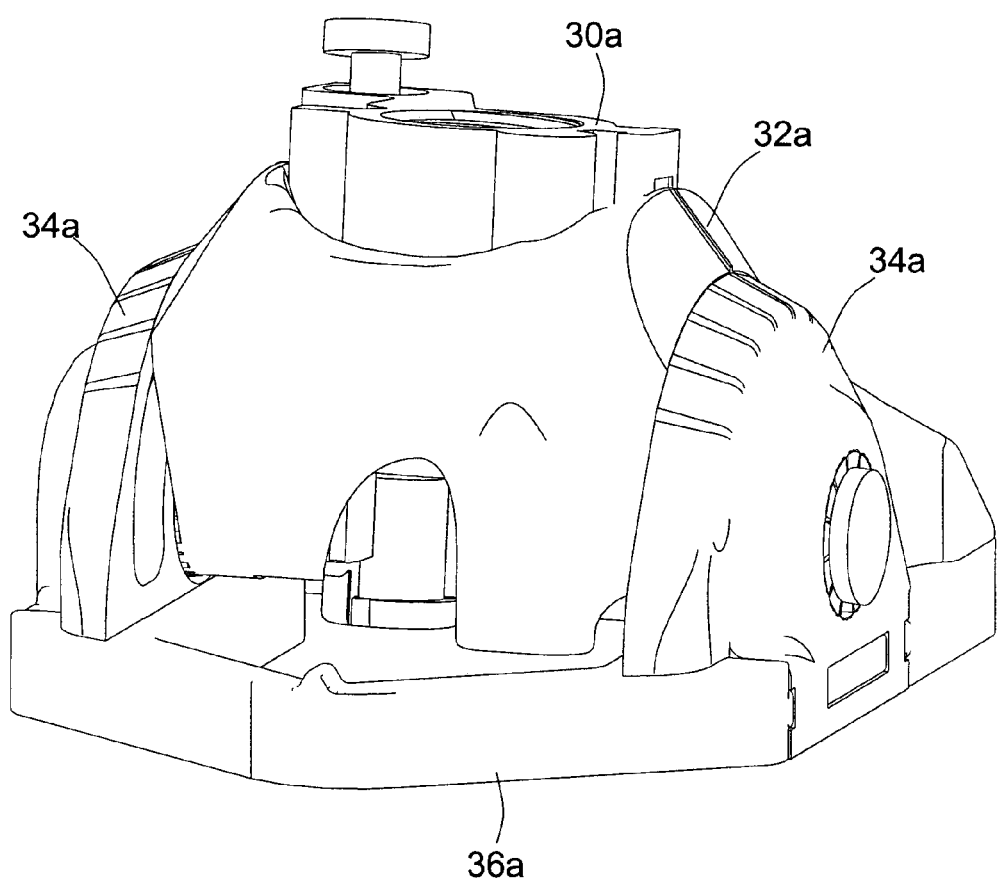

An alternative embodiment of a removable surface positioning guide 10a is shown in FIGS. 9–10. This embodiment is very similar to the first embodiment and it will be understood by one of ordinary skill in the art that this embodiment has similar structures that operate in a very similar manner to the first embodiment. Therefore, only significant changes will be addressed. First it will be noted that there are some cosmetic changes in the design of the surface positioning guide 10a.

Turning to other differences, the guide base and more particularly the base flange 36a of this embodiment includes an intermediate cavity portion 100 along the outer rail surface 48a. This provides laterally spaced coplanar linear guide edges 102 that are connected to the intermediate cavity portion 100 by rounded corners 104. The advantage of this arrangement is that the outer rail surface 48a of the base flange 36a can slide flat or square against flat surfaces for accurate position and also can be maintained at a constant or predetermined location against circular, annular or curved surfaces in which the projecting portion or the working surface enters the cavity portion 100 and the rounded corners 104 engage two spaced points along the circular, annular or curved working surface.

In addition, the arrangement of the axial locking mechanism has been rotated ninety degrees. As shown in FIGS. 9 and 10, a thumb screw 59a extends through the pivot body 32a to engage a rail surface of the mounting adapter 30a. Thus, the thumb screw 59a need not extend through the pillow blocks 34a.

Although preferred embodiments have been shown, there are several alternatives that are also encompassed by the invention. For example, the pivot body 32 could be eliminated and pivoting could take place directly between the mounting adapter and the base member. Another alternative is that linearly sliding and/or plunging movement could take place between the pillow blocks or other support members and the base flange. The base could be a unitary member with integrally formed pillow blocks and base flange members. It should be appreciated that any single aspect, whether it be axially plunging, pivoting adjustment, or interchangeability of the base member could be provided independently in alternative embodiments, not just in combination as shown. These alternatives are not exhaustive of possibilities but are included herein to provide a more comprehensive understanding of the protection that is intended to be afforded herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A removable surface positioning guide for a rotary hand-held tool having a housing and a rotary output, the rotary output adapted to drive a surface engaging bit for engaging a working surface, the removable surface positioning guide comprising:
   a mounting adapter defining a threaded opening, the threaded opening adapted to screw onto the housing of the rotary hand-held tool, the threaded opening adapted to receive the rotary output therethrough;
   a guide base adapted to guide the rotary hand-held tool against the working surface, the guide base being carried by the mounting adapter and defining a second opening adapted to receive the surface engaging bit therethrough; and
   a pivot joint between the guide base and the mounting adapter, the guide base pivoting relative to the mounting adapter about the pivot joint between operable positions, the first and second openings aligning with each other in the operable positions.

2. The removable surface positioning guide of claim 1, further comprising a lock having a locked position locking the guide base relative to the mounting adapter and at a fixed angular position and an unlocked position allowing pivoting movement of the guide base relative to the mounting adapter.

3. The removable surface positioning guide of claim 1, wherein the mounting adapter is made of plastic material, the mounting adapter carrying a plastic pivot body forming part of the pivot joint and supporting the guide base.

4. The removable surface positioning guide of claim 1, wherein the guide base is axially movable relative to the mounting adapter along said tool axis.

5. The removable surface positioning guide of claim 4, wherein the guide base is axially movable between a pair of stops, further comprising a spring supported by the mounting adapter and biasing the guide base axially away from the mounting adapter, the guide base being movable toward the mounting adapter against the biasing of the at least one spring to effect a plunging movement.

6. The removable surface positioning guide of claim 4, wherein at least one of the stops is adjustable relative to the other stop to adjust travel distance of said plunging movement.

7. The removable surface positioning guide of claim 5, further comprising a pivot body pivotably supporting the guide base and slidably supported on the mounting adapter for linear movement relative to the mounting adapter, the pivot body defining pivot structures for the pivot joint.

8. The removable surface positioning guide of claim 1, wherein the guide base comprises a pair of pillow blocks and a base flange, the flange enclosing the second opening, the pillow blocks supporting the base flange and axially spacing the base flange from the pivot joint.

9. The removable surface positioning guide of claim 8, wherein the base flange includes first and second faces on opposing sides of the base flange, the base flange being reversible relative to the pillow blocks to locate either the first or the second face at a forward end of the removable surface positioning guide for engaging a working surface.

10. The removable surface positioning guide of claim 9, wherein the first face is planar for positioning the guide base against a planar working surface, and the second face includes at least two linearly aligned tabs aligned perpendicular relative to the pivoting movement for guiding the guide base along grooves in the working surface.

11. The removable surface positioning guide of claim 1 further comprising at least one viewing window extending radially through the removable surface positioning guide, the at least one viewing window arranged between the pivot joint an a forward end of the base flange for viewing the surface engaging bit when positioned in the second opening.

12. The removable surface positioning guide of claim 1, further comprising means including a scale and a pointer for indicating an angular position of the guide base relative to the mounting adapter.

13. A removable surface positioning guide for a rotary hand-held tool having a housing and a rotary output, the rotary output adapted to drive a surface engaging bit for engaging a working surface, the removable surface positioning guide comprising:
   a mounting adapter defining a threaded opening, the threaded opening adapted to screw onto the housing of the rotary hand-held tool, the threaded opening adapted to receive the rotary output therethrough;
   a guide base adapted to guide the rotary hand-held tool against the working surface, the guide base being carried by the mounting adapter and defining a second opening adapted to receive the surface engaging bit therethrough;

at least one spring supported by the mounting adapter and biasing the guide base axially away from the mounting adapter, the guide base being movable toward the mounting adapter against the biasing of the at least one spring to effect a plunging movement;

a first stop arranged to limit how far the guide base is biased away from the mounting adapter; and a second stop arranged to limit how far the guide base can be moved toward the mounting adapter.

14. The removable surface positioning guide of claim 13, wherein the mounting adapter provides the first and second stops.

15. The removable surface positioning guide of claim 14, further comprising a pivot body slidably supported on the mounting adapter for linear movement relative to the mounting adapter, the pivot body pivotably supporting the guide base wherein the guide base is pivotable relative to the mounting adapter.

16. The removable surface positioning guide of claim 15, further comprising a lock having a locked position locking the guide base relative to the mounting adapter and at a fixed angular position and an unlocked position allowing pivoting movement of the guide base relative to the mounting adapter.

17. The removable surface positioning guide of claim 15, wherein a combination of the pivot body and the mounting adapter define a substantially enclosed spring chamber housing the at least one spring.

18. The removable surface positioning guide of claim 15, wherein the mounting adapter defines a pair of linear guides extending axially, and wherein the pivot body integrally including a pair of linear tracks sliding against the linear guides such that the pivot body is axially movable relative to the mounting adapter.

19. The removable surface positioning guide of claim 14, wherein at least one of the stops is adjustable relative to the other stop to adjust travel distance of said plunging movement.

20. The removable surface positioning guide of claim 19, wherein the adjustable stop includes a threaded bolt threadably mounted into a threaded hole provided by the mounting adapter, the threaded bolt being axially aligned with an abutment surface, rotation of the threaded bolt axially adjusting distance between the abutment surface and the threaded bolt.

21. The removable surface positioning guide of claim 13, wherein the mounting adapter integrally includes an internally threaded sleeve portion concentric about a tool axis adapted to be threadably mounted to the housing of the rotary hand-held tool.

22. The removable surface positioning guide of claim 13, further comprising at least one viewing window extending radially through the removable surface positioning guide, the at least one viewing window arranged between the mounting adapter an a forward end of the base flange for viewing the surface engaging bit when positioned in the second opening.

23. The removable surface positioning guide of claim 13, further comprising means including a scale and a pointer for indicating an axial position of the guide base relative to the mounting adapter.

24. The removable surface positioning guide of claim 13, further comprising a lock having a first position and a second position, the lock in the first position permitting said plunging movement, the lock in the second position locking the mounting adapter to the pivot body at a fixed axial position.

25. A removable surface positioning guide for a rotary hand-held tool having a housing and a rotary output, the rotary output adapted to drive a surface engaging bit for engaging a working surface, the removable surface positioning guide comprising:

a mounting adapter integrally including an internally threaded sleeve portion concentric about a tool axis adapted to be threadably mounted to the housing of the rotary hand-held tool, a pair of linear guides extending axially, and a first stop;

a pivot body integrally including a pair of linear tracks sliding against the linear guides such that the pivot body is axially movable relative to the mounting adapter, the pivot body including a pivot axis perpendicular to the tool axis and a pair of pivot support structures on the pivot axis;

at least one spring supported by the mounting adapter and biasing the pivot body away from the mounting adapter, the first stop engaging the pivot body to limit how far the pivot body is biased away from the mounting adapter;

a pair of pillow blocks integrally providing hinge structures pivotably supported by the pivot support structures; and a base flange for engaging the working surface, the base flange being supported by the pillow blocks and defining an enclosed opening adapted to receive the surface engaging bit therethrough.

26. The removable surface positioning guide of claim 25, further comprising a first lock having a locked position locking the pillow blocks to the pivot body and at a fixed angular position and an unlocked position permitting pivoting movement of the pillow blocks relative to pivot body.

27. The removable surface positioning guide of claim 26, further comprising having a first position and a second position, the lock in the first position permitting axial plunging movement against the action of the spring between the pivot body and the mounting adapter, the lock in the second position locking the mounting adapter to the pivot body at a fixed axial position.

28. The removable surface positioning guide of claim 25, wherein the mounting adapter includes an adjustable stop including a threaded bolt threadably mounted into a threaded hole provided by the mounting adapter, the threaded bolt being axially aligned with an abutment surface defined by a radially extending tab on the pivot body, rotation of the threaded bolt axially adjusting distance between the abutment surface and the threaded bolt.

29. The removable surface positioning guide of claim 25, wherein the base flange includes first and second faces on opposing sides of the base flange, the base flange being reversible relative to the pillow blocks to locate either the first or the second face at a forward end of the removable surface positioning guide for engaging a working surface.

30. The removable surface positioning guide of claim 29, wherein the first face is planar for positioning the guide base against a planar working surface, and the second face includes at least two linearly aligned tabs aligned perpendicular relative to the pivot axis, the tabs being configured for guiding the guide base along grooves in the working surface.

31. The removable surface positioning guide of claim 30, wherein the base flange includes a linear guide rail parallel to the pivot axis on a first side of the pivot axis, and a pair of transverse guide rails that are transverse relative to the pivot axis meeting at a corner on a second side of the pivot axis.

32. The removable surface positioning guide of claim 25, further comprising first means including a first scale and a first pointer for indicating an angular position of the guide base relative to the mounting adapter, and second means including a second scale and a second pointer for indicating an axial position of the guide base relative to the mounting adapter.

33. The removable surface positioning guide of claim 25, wherein a combination of the pivot body and the mounting adapter define a substantially enclosed spring chamber housing two springs equally spaced apart.

* * * * *

UNITED STATES PATENT AND TRADEMARK OFFICE
CERTIFICATE OF CORRECTION

| | |
|---|---|
| PATENT NO. | : 7,131,898 B2 |
| APPLICATION NO. | : 10/825708 |
| DATED | : November 7, 2006 |
| INVENTOR(S) | : Edward Adkins et al. |

It is certified that error appears in the above-identified patent and that said Letters Patent is hereby corrected as shown below:

In the second half of claim 11, the phrase incorrectly reads "between the pivot joint an a forward" and should correctly read --between the pivot joint and a forward--.

In the second half of claim 22, the phrase incorrectly reads "between the mounting adaptor an a forward" and should correctly read --between a mounting adaptor and a forward--.

Signed and Sealed this

Twenty-third Day of January, 2007

JON W. DUDAS
*Director of the United States Patent and Trademark Office*